US008155953B2

(12) United States Patent
Park et al.

(10) Patent No.: US 8,155,953 B2
(45) Date of Patent: Apr. 10, 2012

(54) METHOD AND APPARATUS FOR DISCRIMINATING BETWEEN VOICE AND NON-VOICE USING SOUND MODEL

(75) Inventors: Ki-young Park, Daejeon (KR); Chang-kyu Choi, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1018 days.

(21) Appl. No.: 11/330,343

(22) Filed: Jan. 12, 2006

(65) Prior Publication Data

US 2006/0155537 A1 Jul. 13, 2006

(30) Foreign Application Priority Data

Jan. 12, 2005 (KR) ........................ 10-2005-0002967

(51) Int. Cl.
*G10L 11/06* (2006.01)
*G10L 15/20* (2006.01)

(52) U.S. Cl. ........................................ 704/208; 704/233

(58) Field of Classification Search .................. 704/233, 704/1–230

See application file for complete search history.

(56) References Cited

U.S. PATENT DOCUMENTS

| | | | | |
|---|---|---|---|---|
| 5,970,446 A * | 10/1999 | Goldberg et al. | ............. | 704/233 |
| 6,615,170 B1 | 9/2003 | Liu et al. | | |
| 6,778,954 B1 | 8/2004 | Kim et al. | | |
| 6,782,363 B2 | 8/2004 | Lee et al. | | |
| 2003/0125943 A1 | 7/2003 | Koshiba | | |
| 2004/0064314 A1* | 4/2004 | Aubert et al. | ................. | 704/233 |

FOREIGN PATENT DOCUMENTS

| | | | |
|---|---|---|---|
| JP | 5-108088 | A | 4/1993 |
| JP | 2003-202887 | A | 7/2003 |
| JP | 2004-117624 | A | 4/2004 |
| JP | 2004-272201 | A | 9/2004 |
| KR | 2000-0055394 | A | 9/2000 |

OTHER PUBLICATIONS

Park et al, "Voice activity detection using global soft decision with mixture of Gaussian model", In INTERSPEECH-2004, 965-968.*

Notice of Allowance issued Jun. 7, 2007 by the Korean Intellectual Property Office in corresponding Korean Patent Application No. 10-2005-0002967.

English translation of Notice of Allowance issued Jun. 7, 2007 by the Korean Intellectual Property Office in corresponding Korean Patent Application No. 10-2005-0002967.

* cited by examiner

*Primary Examiner* — Samuel G Neway

(74) *Attorney, Agent, or Firm* — Staas & Halsey LLP

(57) ABSTRACT

A method and an apparatus are provided for discriminating between a voice region and a non-voice region in an environment in which diverse types of noises and voices exist. The voice discrimination apparatus includes a domain transform unit for transforming an input sound signal frame into a frame in the frequency domain, a model training/update unit for setting a voice model and a plurality of noise models in the frequency domain and initializing or updating the models, a speech absence probability (SAP) computation unit for obtaining a SAP computation equation for each noise source by using the initialized or updated voice model and noise models and substituting the transformed frame into the equation to compute an SAP for each noise source, a noise source selection unit for selecting the noise source by comparing the SAPs computed for the respective noise sources, and a voice judgment unit for judging whether the input frame corresponds to the voice region in accordance with the SAP level of the selected noise source.

15 Claims, 6 Drawing Sheets

METHOD AND APPARATUS FOR DISCRIMINATING BETWEEN VOICE AND NON-VOICE USING SOUND MODEL

CROSS-REFERENCE TO RELATED APPLICATION

This application claims priority from Korean Patent Application No. 10-2005-0002967 filed on Jan. 12, 2005 in the Korean Intellectual Property Office, the disclosure of which is incorporated herein by reference in its entirety.

BACKGROUND OF THE DISCLOSURE

1. Field of the Disclosure

The present disclosure relates to a voice recognition technique, and more particularly to a method and an apparatus for discriminating between a voice region and a non-voice region in an environment in which diverse types of noises and voices exist.

2. Description of the Prior Art

Recently, owing to the development of computers and the advancement of communication technology, diverse multimedia-related techniques, such as a technique for creating and editing various kinds of multimedia data, a technique for recognizing an image or voice from input multimedia data, a technique for efficiently compressing an image or voice, and others have been developed. Accordingly, the technique for detecting a voice region in a certain noise environment may be considered a platform technique that is required in diverse fields including the fields of voice recognition and voice compression. The reason it is not easy to detect the voice region is that the voice content tends to mix with various kinds of noises. Also, even if the voice is mixed with one kind of noise, it may appear in diverse forms such as burst noise, sporadic noise, and others. Hence, it is difficult to discriminate and extract the voice region in certain environments.

Conventional techniques of discriminating between voice and non-voice have some drawbacks. Since these techniques use the energy of a signal as a major parameter, there is no method for discriminating the voice from sporadic noise, which is not easily discriminated from the voice unlike burst noise, it is not possible to predict the performance with respect to unpredicted noise because only one noise source is assumed, and variation of the input signal over time cannot be considered due to only having information about the present frame.

For example, U.S. Pat. No. 6,782,363, entitled "Method and Apparatus for Performing Real-Time Endpoint Detection in Automatic Speech Recognition," issued to Lee et al. on Aug. 24, 2004, discloses a technique of extracting a one-dimensional specific parameter from an input signal, filtering the extracted parameter to perform edge detection, and discriminating the voice region from the input signal using a finite state machine. However, this technique has a drawback in that it uses an energy-based specific parameter and thus has no measures for sporadic noise, which is considered a voice.

U.S. Pat. No. 6,615,170, entitled "Model-Based Voice Activity Detection System and Method Using a Log-Likelihood Ratio and Pitch," issued to Lie et al. on Sep. 2, 2003, discloses a method of training a noise model and a speech model in advance and computing the probability that the model is equal to input data. This method accumulates outputs of several frames to compare the accumulated output with thresholds, as well as with a single frame. However, this method has a drawback in that the performance of discriminating an unpredicted noise cannot be secured since it has no model for the voice in a noise environment but creates separate models for noise and voice.

Meanwhile, U.S. Pat. No. 6,778,954, entitled "Speech Enhancement Method," issued to Kim et al. on Aug. 17, 2004, discloses a method for estimating noise and voice components in real time using a Gaussian distribution and model updating. However, this method also has the drawback that since it uses a single noise source model, it is not suitable in an environment in which a plurality of noise sources exist, and it is greatly affected by the input energy.

SUMMARY OF THE DISCLOSURE

Accordingly, the present invention has been made to solve the above-mentioned problems occurring in the prior art, and an object of the present invention is to provide a method and an apparatus for more accurately extracting a voice region in an environment in which a plurality of sound sources exist.

Another object of the present invention is to provide a method and an apparatus for efficiently modeling a noise which is not suitable to a single Gaussian model such as a sporadic noise by modeling a noise source using a Gaussian mixture model.

Still another object of the present invention is to reduce an amount of computation of a system by performing a dimensional spatial transform of an input sound signal.

Additional advantages, objects, and features of the invention will be set forth in the description which follows and will become apparent to those of ordinary skill in the art upon examination of the following or may be ascertained from the practice of the invention.

In order to accomplish these objects, there is provided a voice discrimination apparatus for determining whether an input sound signal corresponds to a voice region or a non-voice region, according to the present invention, which comprises a domain transform unit for transforming an input sound signal frame into a frame in a frequency domain; a model training/update unit for setting a voice model and a plurality of noise models in the frequency domain and initializing or updating the models; a speech absence probability (SAP) computation unit for obtaining a computation equation of a SAP for each noise source by using the initialized or updated voice model and noise models and substituting the transformed frame in the equation to compute the SAP for each noise source; a noise source selection unit for selecting the noise source by comparing the SAPs computed for the respective noise sources; and a voice judgment unit for judging whether the input frame corresponds to the voice region in accordance with a level of the SAP of the selected noise source.

In another aspect of the present invention, there is provided a voice discrimination apparatus for determining whether an input sound signal corresponds to a voice region or a non-voice region, which comprises a domain transform unit for transforming an input sound signal frame into a frame in a frequency domain; a dimensional spatial transform unit for linearly transforming the frame in the frequency domain to reduce a dimension of the transformed frame; a model training/update unit for setting a voice model and a plurality of noise models in the linearly transformed domain and initializing or updating the models; a speech absence probability (SAP) computation unit for obtaining a computation equation of a SAP for each noise source by using the initialized or updated voice model and noise models and substituting the transformed frame in the equation to compute the SAP for each noise source; a noise source selection unit for selecting the noise source by comparing the SAPs computed for the respective noise sources; and a voice judgment unit for judging whether the input frame corresponds to the voice region in accordance with a level of the SAP of the selected noise source.

In still another aspect of the present invention, there is provided a voice discrimination method for determining whether an input sound signal corresponds to a voice region or a non-voice region, which comprises the steps of setting a voice model and a plurality of noise models in a frequency domain, and initializing the models; transforming an input sound signal frame into a frame in the frequency domain; obtaining a computation equation of a speech absence probability (SAP) for each noise source by using the initialized or updated voice model and noise models; substituting the transformed frame in the equation to compute the SAP for each noise source; comparing the SAPs computed for the respective noise sources to select the noise source; and judging whether the input frame corresponds to the voice region in accordance with a level of the SAP of the selected noise source.

In still another aspect of the present invention, there is provided a voice discrimination method for determining whether an input sound signal corresponds to a voice region or a non-voice region, which comprises the steps of: setting a voice model and a plurality of noise models in a linearly transformed domain and initializing the models; transforming an input sound signal frame into a frame in the frequency domain; linearly transforming the frame in the domain to reduce a dimension of the transformed frame; obtaining a computation equation of a speech absence probability (SAP) for each noise source by using the initialized or updated voice model and noise models; substituting the transformed frame in the equation to compute the SAP for each noise source; comparing the SAPs computed for the respective noise sources to select the noise source; and judging whether the input frame corresponds to the voice region in accordance with a level of the SAP of the selected noise source.

BRIEF DESCRIPTION OF THE DRAWINGS

The above and other objects, features and advantages of the present invention will become apparent from the following detailed description taken in conjunction with the accompanying drawings, in which.

DETAILED DESCRIPTION OF THE PREFERRED EMBODIMENTS

Figure 1:
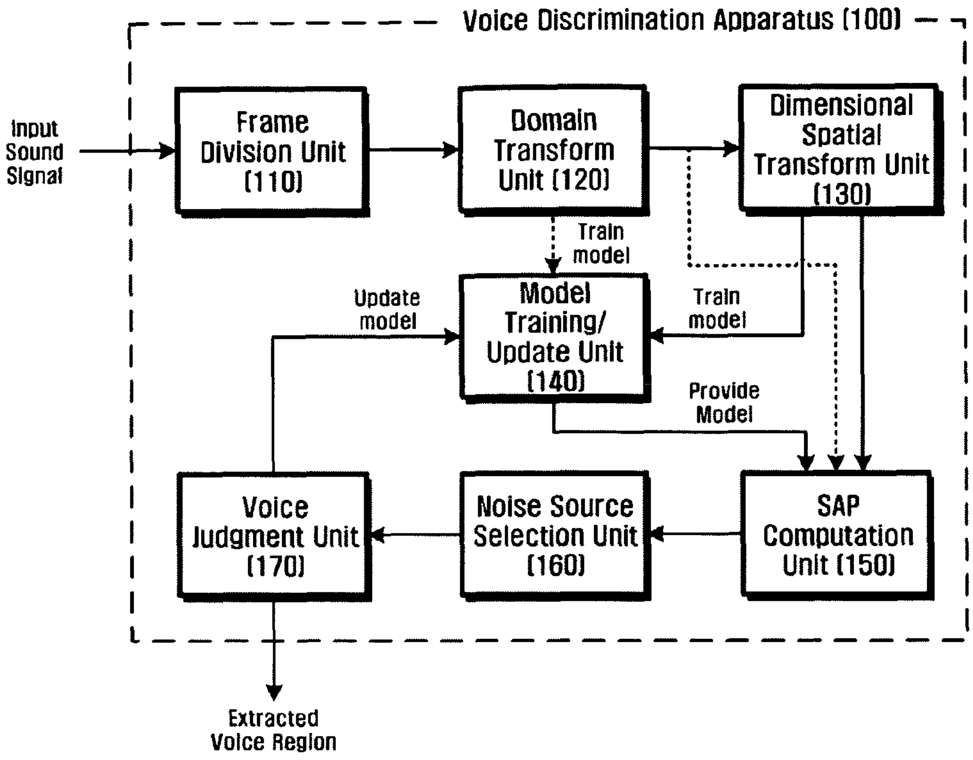
FIG. 1 is a block diagram illustrating a construction of a voice discrimination apparatus according to an embodiment of the present invention.

Hereinafter, preferred embodiments of the present invention will be described in detail with reference to the accompanying drawings. The aspects and features of the present invention and methods for achieving the aspects and features will become further apparent by referring to the embodiments described in detail in the following with reference to the accompanying drawings. However, the present invention is not limited to the embodiments disclosed hereinafter, but can be implemented in diverse forms. The matters defined in the description, such as the detailed construction and elements, are nothing but specific exemplary details provided to assist those ordinary skilled in the art in a comprehensive understanding of the invention, and the present invention is only defined within the scope of appended claims. In the entire description of the present invention, the same drawing reference numerals are used for the same elements across various figures.

FIG. 1 is a block diagram illustrating a construction of a voice discrimination apparatus 100 according to an embodiment of the present invention. The voice discrimination apparatus 100 includes a frame division unit 110, a domain transform unit 120, a dimensional spatial transform unit 130, a model training/update unit 140, a speech absence probability (SAP) computation unit 150, a noise source selection unit 160, and a voice judgment unit 170.

The frame division unit 110 divides an input sound signal into frames. Such a frame is expressed by a predetermined number (for example, 256) of signal samples of the sound source that correspond to a predetermined time unit (for example, 20 seconds), and is a unit of data that can be processed in transforms, compressions, and others. The number of signal samples can be selected according to the desired sound quality.

The domain transform unit 120 transforms the divided frame into the frequency domain. The domain transform unit 120 uses a Fast Fourier Transform (hereinafter referred to as "FFT"), which is a kind of Fourier transform. An input signal y(n) is transformed into a signal $Y_k(t)$ of the frequency domain through Equation (1), which is the FFT.

$$Y_k(t) = \frac{2}{M}\sum_{n=0}^{M-1} y(n) \times \exp\left[-\frac{j2\pi nk}{M}\right], \quad 0 \le k \le M \tag{1}$$

where, t denotes a number of a frame, k is an index which indicates the frequency number, and $Y_k(t)$ the k-th frequency spectrum of the t-th frame of the input signal. Since the actual operation is performed for each channel, the equation does not use $Y_k(t)$ directly, but uses a spectrum $G_i(t)$ of a signal corresponding to the i-th channel of the t-th frame. $G_i(t)$ denotes an average of a frequency spectrum corresponding to the i-th channel. Hence, one channel sample is created for each channel in one frame.

The dimensional spatial transform unit 130 transforms the signal spectrum $G_i(t)$ for the specific channel into a dimensional space that can accurately represent the feature through a linear transform. This dimensional spatial transform is performed by Equation (2):

$$g_j(t) = \sum_{i=j_1}^{j_h} c(j, i) G_i(t) \tag{2}$$

Various dimensional spatial transforms, such as the transform based on a Mel-filter bank, which is defined in the European Telecommunication Standards Institute (ETSI) standard, a PCA (principal coordinate analysis) transform, and others, may be used. If the Mel-filter bank is used, the output $g_j(t)$ of Equation (2) becomes the j-th Mel-spectral component. For example, 129 i-components may be reduced to 23 j-components through this transform, thereby reducing the amount of subsequent computation.

The output $g_j(t)$ is outputted after the dimensional spatial transform is performed and may be expressed as the sum of a voice signal spectrum and a noise signal spectrum, as shown in Equation (3):

$$g_j(t) = S_j(t) + N_j^m(t), \tag{3}$$

where $S_j(t)$ denotes the spectrum of the j-th voice signal of the t-th frame, $N_j^m(t)$ the spectrum of the j-th noise signal of the t-th frame for the m-th noise source, and $S_j(t)$ and $N_j^m(t)$ the voice signal component and the noise signal component in the transformed space, respectively.

In implementing the present invention, the dimensional spatial transform is not compulsory, and the following process may be performed using the original, without performing the dimensional spatial transform.

The model training/update unit 140 initializes parameters of the sound model and the plurality of noise models with respect to the initial specified number of frames; i.e., it initializes the model. The specified number of frames is optionally selected. For example, if the number is set to 10 frames, at least 10 frames are used for the model training. The voice signal inputted during the initialization of the voice model and the plurality of noise models is used to simply initialize the parameters; it is not used to discriminate the voice signal.

In the present invention, one voice model is modeled by using a Laplacian or Gaussian distribution, and a plurality of noise models are modeled by using a Gaussian mixture model (GMM). It should be noted that a plurality of noise models are not modeled by one GMM, but by several GMMs.

The voice model and the plurality of noise models may be created based on the frame (i.e., in the frequency domain), which is transformed into the frequency domain by the domain transform unit 120 in the case where the dimensional spatial transform is not used. On the assumption that the dimensional spatial transform is used, however, the present invention is explained with reference to the case in which the models are created based on the transformed frame (i.e., in the linearly transformed domain).

The voice model and the plurality of noise models may have different parameters by channels. In the case of modeling the voice model by using the Laplacian model and modeling the respective noise models by using the GMM (hereinafter referred to as the first embodiment), the probability that the input signal will be found in the voice model or noise models is given by Equation (4). In Equation (4), m is an index indicative of the kind of noise source. Specifically, m should be appended to all parameters by noise models, but will be omitted from this explanation for convenience. Although the parameters are different from each other for the respective noise models, they are applied to the same equation. Accordingly, even if the index is omitted, it will not cause confusion. In this case, the parameter of voice model is $a_j$, and the parameters of the noise models are $w_{j,l}$, $\mu_{j,l}$, and $\sigma_{j,l}$.

Voice model: (4)

$$P_{S_j}[g_j(t)] = \frac{1}{2a_j}\exp\left[-\frac{|g_j(t)|}{a_j}\right]$$

Noise model:

$$P_{N_j^m}[g_j(t)] = P^m[g_j(t) \mid H_0] = \sum_l w_{j,l}\frac{1}{\sqrt{2\pi\sigma_{j,l}^2}}\exp\left[-\frac{(g_j(t)-\mu_{j,l})^2}{\sigma_{j,l}^2}\right]$$

In this case, a model for the respective signals in which the noise and the voice are mixed, i.e., a mixed voice/noise model, can be produced using Equation (5):

$$P^m[g_j(t) \mid H_1] = \sum_l \frac{w_{j,l}}{4a_j}\times\exp\left[\frac{\sigma_{j,l}^2}{a_j^2}\right]\times\left[\exp\left[\frac{g_j(t)}{a_j}\right]\times erfc\left[\frac{a\cdot g_j(t)+\sigma_{j,l}^2}{\sqrt{2}\,a_j\sigma_{j,l}}\right]+\exp\left[-\frac{g_j(t)}{a_j}\right]\times erfc\left[\frac{-a\cdot g_j(t)+\sigma_{j,l}^2}{\sqrt{2}\,a_j\sigma_{j,l}}\right]\right] \tag{5}$$

where erfc[ . . . ] denotes a complimentary error function.

In the case in which one voice model is modeled by using the Gaussian model and a plurality of noise models are modeled by using the Gaussian mixture model (hereinafter referred to as the second embodiment), the noise model is given by Equation (4), while the voice model is given by Equation (6). In this case, the parameters of the voice model are $\mu_j$ and $\sigma_j$.

$$P_{S_j}[g_j(t)] = \frac{1}{\pi\sigma_j^2}\exp\left[-\frac{(g_j(t)-\mu_j)^2}{\sigma_j^2}\right] \tag{6}$$

In this case, the mixed voice/noise model is given by Equation (7):

$$P^m[g_j(t) \mid H_1] = \sum_l w_{j,l}\frac{1}{\sqrt{2\pi\lambda_{j,l}^2}}\exp\left[-\frac{(g_j(t)-m_{j,l})^2}{\lambda_{j,l}^2}\right], \tag{7}$$

where $$\lambda_{j,l}^2 = \sigma_j^2 + \sigma_{j,l}^2,$$

and $$m_{j,l}^2 = \mu_j^2 + \mu_{j,l}^2.$$

The model training/update unit 140 performs not only the process of training the sound model and the plurality of noise models during a training period (i.e., a process of initializing parameters), but also the process of updating the voice model and the noise models for the respective frames whenever a sound signal is inputted that needs a voice and a non-voice to be discriminated (i.e., the process of updating parameters). The processes of initializing the parameters and updating the parameters are performed by the same algorithm; for example, an expectation-maximization (EM) algorithm (to be described below). The sound signal composed of at least the specified number of frames and inputted during initialization is used only to determine the initial values of the parameters. Thereafter, if the sound signal to discriminate between the voice and the non-voice is inputted for each frame, the voice and the non-voice are discriminated from each other in accordance with the present parameter, and then the present parameter is updated.

In the first embodiment, the EM algorithm mainly used to initialize and update the parameters is as follows. First, in the case of the Laplacian voice model, $a_j$ is trained or updated by Equation (8), where $\alpha$ is a reflective ratio; if $\alpha$ is high, the reflective ratio of an existing value $\alpha_j^{old}$ is increased, while if $\alpha$ is low, the reflective ratio of the changed value $\underset{\sim}{\alpha}_j$ is increased.

$$\alpha_j^{new}=\alpha\times\alpha_j^{old}+(1-\alpha)\times\underset{\sim}{\alpha}_j$$

$$\underset{\sim}{\alpha}_j=P_{s_j}[g_j(t)] \tag{8}$$

where, $\alpha_j^{new}$ denotes the present value of $\alpha_j$, and $\alpha_j^{old}$ denotes the previous value of $\alpha_j$.

In the case of the noise model, since the respective noise models are modeled by GMM, the parameters are trained and updated by Equations (9) through (11). These parameters are trained or updated for the respective Gaussian models that constitute the GMM.

Specifically, parameter sets are trained or updated for a plurality of noise sources (which are different according to m), but in the case of the respective noise sources, the parameter sets are again trained or updated for a plurality of Gaussian models (which are different according to 1). For example, if the number of noise sources is 3 (i.e., m=3) and the modeling is performed by a GMM composed of 4 (i.e., l=4) Gaussian models, there are 3×4 parameter sets (one parameter set is composed of $w_{j,l}$, $\mu_{j,l}$, and $\sigma_{j,l}$), and these sets are trained or updated.

First, $w_{j,l}$ is trained or updated by Equation (9):

$$w_{j,l}^{new}=\alpha\times w_{j,l}^{old}+(1-\alpha)\times\tilde{w}_{j,l} \tag{9}$$

$$\tilde{w}_{j,l}=\frac{w_{j,l}\times P_{N_{j,l}^m}[g_j(t)]}{\sum_{k=1}^{M}w_{j,k}\times P_{N_{j,k}^m}[g_j(t)]}$$

Next, $\mu_{j,l}$ is trained or updated by Equation (10):

$$\mu_{j,l}^{new}=\alpha\times\mu_{j,l}^{old}+(1-\alpha)\times\underset{\sim}{\mu}_{j,l}$$

$$\underset{\sim}{\mu}_{j,l}=P_{N_{l,j}^m}[g_j(t)]\times g_j(t) \tag{10}$$

Then, $\sigma_{j,l}$ is trained or updated by Equation (11):

$$\sigma_{j,l}^{new}=\alpha\times\sigma_{j,l}^{old}+(1-\alpha)\times\underset{\sim}{\sigma}_{j,l}$$

$$\underset{\sim}{\sigma}_{j,l}=P_{N_{j,l}^m}[g_j(t)]\times[g_j(t)-\mu_{j,l}]^2 \tag{11}$$

In the second embodiment, the parameter $\mu_j$ of the voice model that follows a single Gaussian distribution is trained or updated by Equation (12), and $\sigma_j$ is trained or updated by Equation (13). In this case, the noise source of the second embodiment is modeled by GMM in the same manner as the first embodiment.

$$\mu_j^{new}=\alpha\times\mu_j^{old}+(1-\alpha)\times\underset{\sim}{\mu}_j$$

$$\underset{\sim}{\mu}_j=P_{s_j}[g_j(t)]\times g_j(t) \tag{12}$$

$$\sigma_j^{new}=\alpha\times\sigma_j^{old}+(1-\alpha)\times\underset{\sim}{\sigma}_j$$

$$\underset{\sim}{\sigma}_j=P_{s_j}[g_j(t)]\times[g_j(t)-\mu_j]^2 \tag{13}$$

Referring again to FIG. 1, the SAP computation unit 150 computes a speech absence probability (SAP) for each noise by using the initialized or updated voice model and noise models and substituting the transformed frame into the equation.

More specifically, the SAP computation unit 150 may compute the SAP for a specific noise source by using Equation (14). Of course, the SAP computation unit 150 may compute a speech presence probability, which may be subtracted from the SAP. Hence, a user may compute either the SAP or the speech presence probability, if necessary.

$$P^m[H_0\mid g(t)]=\frac{P^m[g(t)\mid H_0]\times P^m[H_0]}{P^m[g(t)\mid H_0]\times P^m[H_0]+P^m[g(t)\mid H_1]\times P^m[H_1]}, \tag{14}$$

where $P^m[H_0|g(t)]$ denotes the SAP for a signal g(t) inputted into the voice discrimination apparatus 100 on the basis of a specific noise source model (index: m), g(t) is an input signal of one frame (index: t) composed of a component $g_j(t)$ for each spectrum, and g(t) an input signal in a transformed domain, respectively.

On the assumption that a spectrum component of each frequency channel is independent, the SAP is given by Equation (15):

$$P^m[H_0\mid g(t)]=\frac{\prod_j P^m[g_j(t)\mid H_0]\times P[H_0]}{\prod_j P^m[g_j(t)\mid H_0]\times P[H_0]+\prod_j P^m[g_j(t)\mid H_1]\times P[H_1]}=\frac{1}{1+\frac{P[H_1]}{P[H_0]}\prod_j\Lambda^m[g_j(t)]} \tag{15}$$

where $P[H_0]$ denotes the probability that a certain point of an input signal corresponds to the noise region, $P[H_1]$ denotes the probability that a certain point of an input signal corresponds to the voice/noise mixed region, and $\Lambda^m[g_j(t)]$ is a likelihood ratio. $\Lambda^m[g_j(t)]$ may be defined by Equation (16):

$$\Lambda^m[g_j(t)]=\frac{P^m(g_j(t)\mid H_1)}{P^m(g_j(t)\mid H_0)}, \tag{16}$$

where $P^m(g_j(t)|H_0)$ can be obtained from the noise model of Equation (4), and $P^m(g_j(t)|H_0)$ can be obtained from Equation (5) or (7) according to the case of using the Laplacian distribution (i.e., the first embodiment) or the case of using the Gaussian distribution (i.e., the second embodiment) in the voice model.

When the SAP for the respective noise sources is computed by the SAP computation unit 150, the computed result is inputted to the noise source selection unit 160.

The noise source selection unit 160 compares the SAPs for the computed noise sources to select the noise source. More specifically, the noise source selection unit 160 may select the noise source having the minimum SAP $P^m[H_0|g(t)]$. This means that there is the lowest probability that the sound signal presently inputted is not found in the selected noise source. In other words, it is highly probable that the sound signal is found in the selected noise source. For example, if three noise sources (m=3) are used, the noise source having the minimum SAP should be selected among three input SAPs $P^1[H_0|g(t)]$, $P^2[H_0|g(t)]$ and $P^3[H_0|g(t)]$. For example, if $P^2[H_0|g(t)]$ is the minimum, the second noise source is selected.

Even if the noise source selection unit 160 computes the speech presence probability instead of the SAP and selects the noise source having the maximum speech prescence probability, the same effect may be obtained.

The voice judgment unit 170 determines whether the input frame corresponds to the voice region of the input frame based on the SAP level of the selected noise source. Also, the voice judgment unit 170 may extract a region, in which the voice exists, from the respective frames of the input signal (i.e., the mixed voice/noise region). In this case, if the SAP of the noise source selected by the noise source selection unit 160 is less than a given critical value, the voice judgment unit 170 determines that the corresponding frame corresponds to the voice region. The critical value is a factor for deciding the rigidity of criteria of determining the voice region. If the critical value is high, the corresponding frame may be too easily classified as the voice region, while if the critical value is low, it may be too difficult to classify the corresponding frame as the voice region (i.e., the corresponding frame may be too easily determined as a noise region). The extracted voice region (specifically, the frames judged to contain a voice) may be displayed in the form of a graph or table through a specified display device.

If the voice judgment unit 170 extracts the voice region from the frame region of the input sound signal, the extracted result is sent to the model training/update unit 140, and the model training/update unit 140 updates the parameters of the voice model and noise models by using the EM algorithm described above. That is, if the frame presently inputted is determined to correspond to a voice region, the voice judgment unit 170 updates the voice model, while if the frame presently inputted corresponds to a noise region of a specific noise source, the voice judgment unit 170 updates the noise model for the specific noise source.

Figure 2:
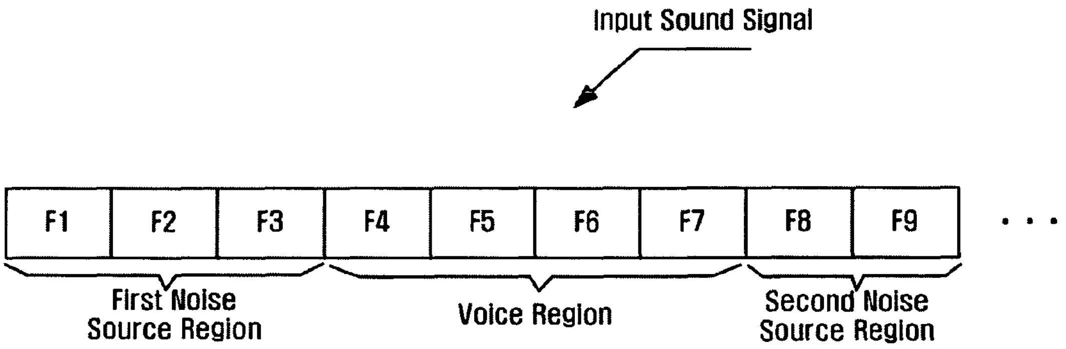
FIG. 2 is a view illustrating an example input sound signal consisting of a plurality of frames which is divided into voice regions and a noise regions for each noise source.

Referring to FIG. 2, the input sound signal is divided into a voice region and a noise region by the voice judgment unit 170, and the noise region is subdivided in accordance with respective noise sources (selected by the noise source selection unit 160). In FIG. 2, symbols F1 through F9 denote a series of successive frames. For example, after F1 is inputted and processed, the model training/update unit 140 updates the noise model for the first noise source. After F4 is processed, the model training/update unit 140 updates the voice model, and after F8 is processed, the model training/update unit 140 updates the noise model for the second noise source. Since the process of the voice discrimination apparatus 100 of this embodiment is performed on a single frame, the model updating process is also performed on a single frame.

It has been explained that the dimensional spatial deforming unit 130 performs a linear transform of only the signal spectrums of the sound signal frame presently inputted. However, the present invention is not limited thereto, and it may perform the dimensional spatial transform on the present frame and a derivative frame indicative of the relation between the present frame and the previous frames in order to easily comprehend the characteristic of the signal and use information relevant to the frame. The derivative frame is an imaginary frame to be created from the desired number of frames positioned adjacent to the present frame.

If nine frame windows are used, a speed frame $gv_i(t)$ of the derivative frame can be produced using Equation (17), and an acceleration frame $ga_i(t)$ of the derivative frame can be produced using Equation (18). The use of nine frame windows and coefficients (reflection ratios) (below) will be apparent to those skilled in the art. Here, $g_i(t)$ denotes the signal spectrum of the i-th channel of the t-th frame (i.e., the present frame).

$$gv_i(t)=-1.0g_i(t-4)-0.75g_i(t-3)-0.5g_i(t-2)-0.25g_i(t-1)-0.25g_i(t+1)+0.5g_i(t+2)+0.75g_i(t+3)+1.0g_i(t+4) \tag{17}$$

$$g\alpha_i(t)=1.0g_i(t-4)+0.25g_i(t-3)-0.285714g_i(t-2)-0.607143g_i(t-1)-0.714286g_i(t)-0.607143g_i(t+1)-0.2857140.5g_i(t+2)+0.25g_i(t+3)+1.0g_i(t+4) \tag{18}$$

If the number of channels (samples) of the present frame is 129, the number of derivative frames corresponding to the present frame is also 129, and thus the number of channels of the integrated frame becomes 129×2. Hence, if the integrated frame is transformed by the Mel filter bank transform method, the number of components of the integrated frame is reduced to 23×2.

For example, in the case of using the speed frame as the derivative frame, the integrated frame I(t) may be given by combination of the present frame and the speed frame, as shown in Equation (19):

$$I(t)=\begin{bmatrix} g_1(t) \\ ¢° \\ g_n(t) \\ gv_1(t) \\ ¢° \\ gv_n(t) \end{bmatrix} \tag{19}$$

The integrated frame is processed by the same processing method that is used for the present frame, but the number of channels is doubled.

The constituent elements of FIG. 1 may mean software or hardware such as a field-programmable gate array (FPGA) or an application-specific integrated circuit (ASIC). The constituent elements may reside in an addressable storage medium or they may be constructed to execute one or more processors. Functions provided in the respective elements may be implemented by subdivided constituent elements, or they may be implemented by one constituent element in which a plurality of constituent elements are combined to perform a specific function.

The function of the present invention can be mainly classified into a first process of updating a voice model and a plurality of noise models by using an input sound signal, and a second process of discriminating the voice region and the noise region from the input sound signal and updating the voice model and the plurality of noise models.

Figure 3:
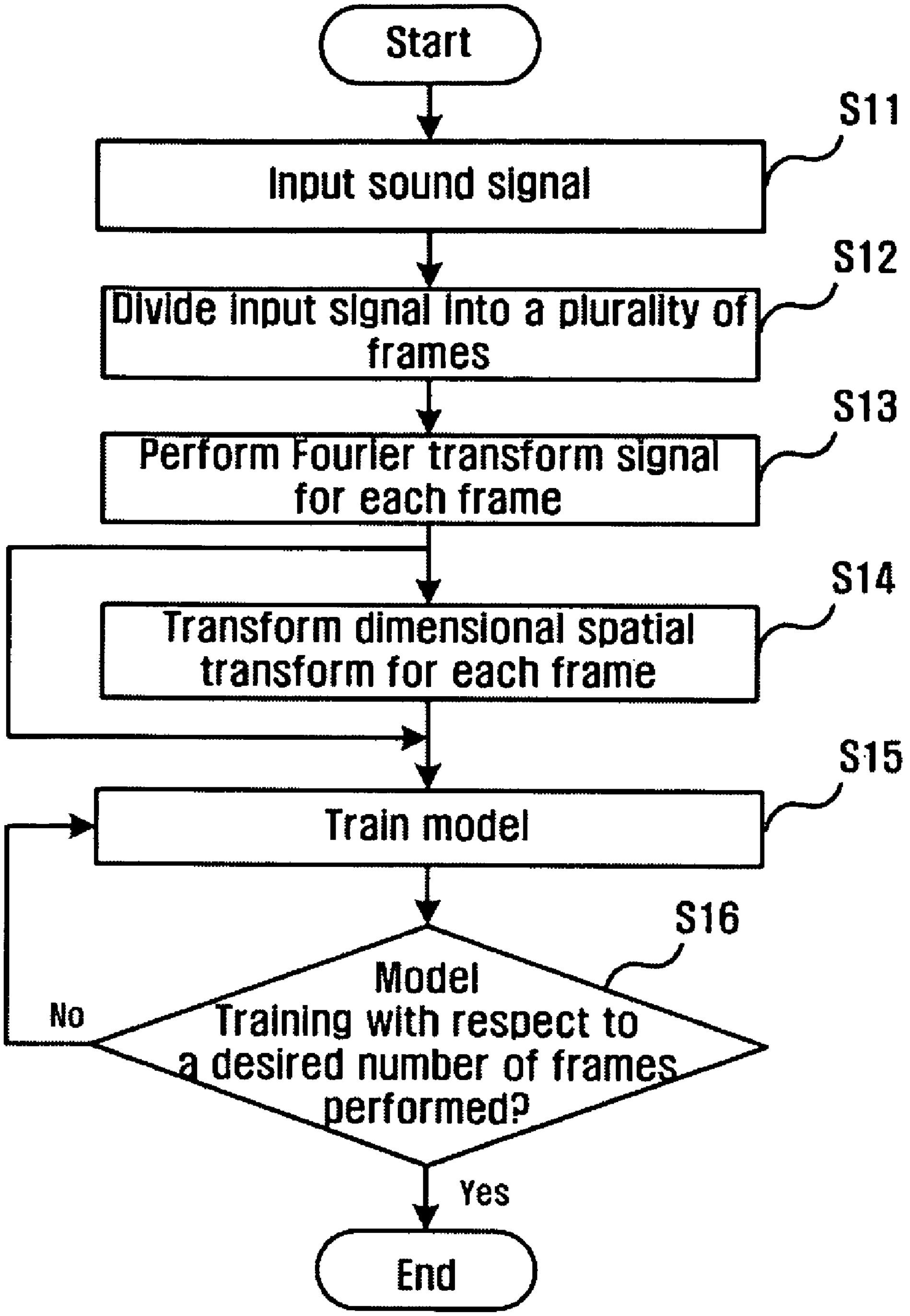
FIG. 3 is a flowchart illustrating an example of a first process according to the present invention.

FIG. 3 is a flowchart illustrating an example of the first process according to the present invention.

If a sound signal for model training is inputted to the voice discrimination apparatus 100 S11, the frame division unit 110 divides the input signal into a plurality of frames S12. The domain transform unit 120 performs a Fourier transform on the respective divided frames S13.

In the case of employing the dimensional spatial transform, the dimensional spatial transform unit 130 performs the dimensional spatial transform on the Fourier-transformed frames to decrease the components of the frame S14. If the dimensional spatial transform is not used, step S14 may be omitted.

Then, the model training/update unit 140 sets a desired sound model and a plurality of noise models and performs a model training process to initialize parameters constituting the models by using the frame of the input training sound signal (Fourier transformed or spatially transformed) S15.

If the model training step S15 is performed for the specified number of training sound signals ("yes" in S16), the process is ended. Otherwise ("no" in S16), step S15 is repeated.

Figure 4:
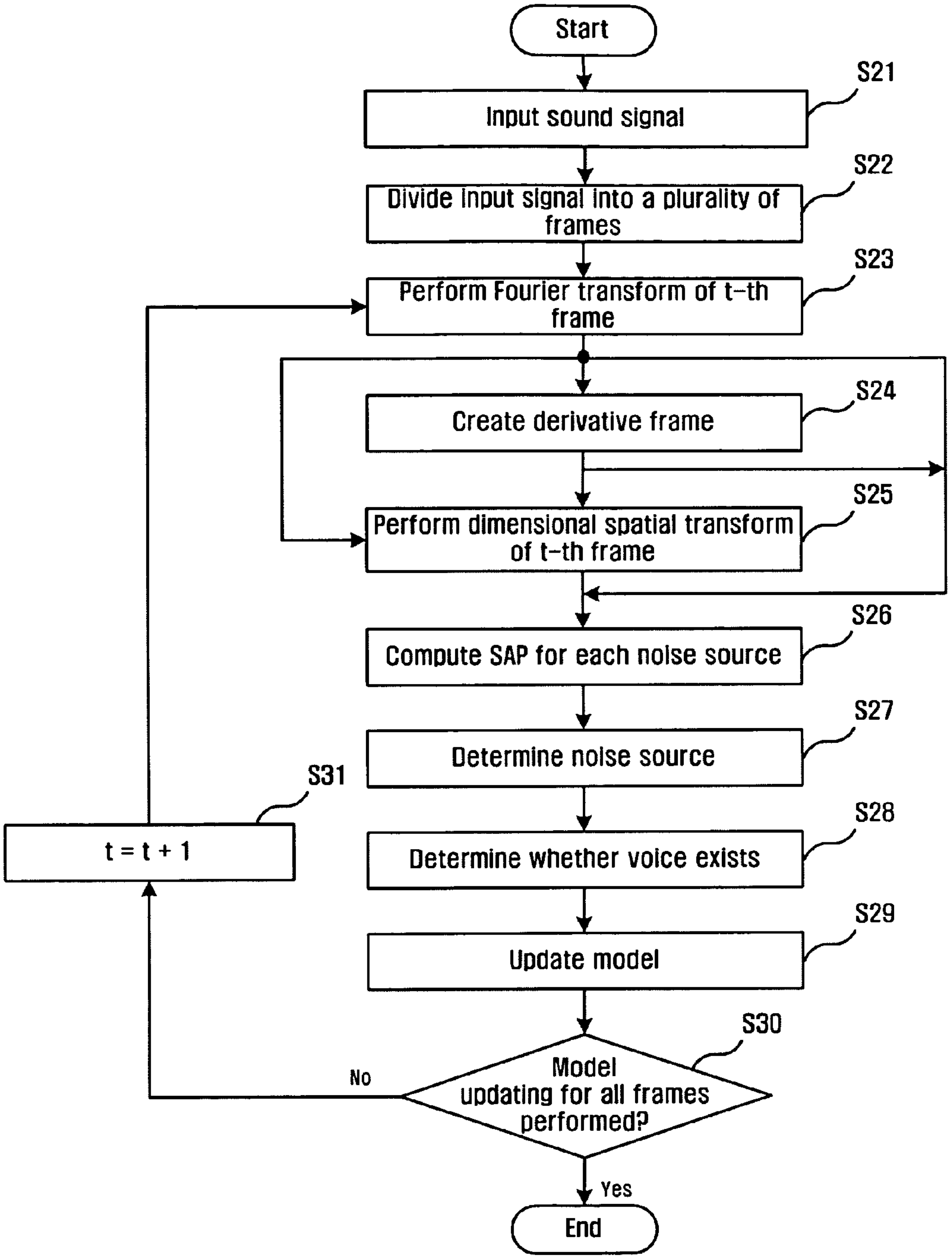
FIG. 4 is a flowchart illustrating an example of a second process according to the present invention.

FIG. 4 is a flowchart illustrating an example of the second process according to the present invention.

If a sound signal from which a voice and a non-voice are to be discriminated is inputted after the training process of FIG. 3 is ended S21, the frame division unit 110 divides the input signal into a plurality of frames S22. Then, the domain transform unit 120 Fourier-transforms the present frame (the t-th frame) among the plurality of frames S23. After the Fourier transform is performed, the process may proceed to step S26 to compute the SAP or to step S24 to create the derivative frame.

The case in which the Fourier transform S23 and the dimensional spatial transform S25 are performed according to an embodiment of the present invention will be explained in the following. Thereafter, the dimensional spatial transform unit 130 performs the dimensional spatial transform on the Fourier-transformed frame to reduce the components of the frame S25.

The SAP computation unit 150 computes the SAP (or speech presence probability) for the dimensional spatial transformed frame for each noise source by using a specified algorithm S26. The noise source selection unit 160 selects the noise source corresponding to the lowest SAP (or the noise source having the highest speech presence probability) S27.

Then, the voice judgment unit 170 determines whether the voice exists in the present frame by ascertaining if the SAP according to the selected noise source model is lower than a specified critical value S28. By performing the judgment with respect to the entire set of frames, the voice judgment unit 170 can extract the voice region (i.e., the voice frame) the entire set of frames.

Finally, if the voice judgment unit 170 determines that a voice exists in the present frame, the model training/update unit 140 updates the parameters of the voice models. If it is determined that the voice does not exist in the present frame, the model training/update unit 140 updates the parameters of the model for the noise source selected by the noise source selection unit 160 S29.

Meanwhile, in another embodiment of the present invention which further includes step S24, the dimensional spatial transform unit 130, having received the present Fourier-transformed frame in step S23, creates a derivative frame from the present frame S24, and spatially transforms the integrated frame (a combination of the present frame and the derivative frame) S25. Then, the steps following step S26 are performed with respect to the integrated frame (a detailed explanation thereof is omitted).

Hereinafter, test results of the present invention will be explained in comparison to those according to U.S. Pat. No. 6,778, 954 (hereinafter referred to as the "'954 patent"). The input sound signal used in the test corresponded to 50 sentences vocalized by a man (average 19.2 milliseconds), and an additive white Gaussian noise simulating an environment of SNR 0 dB and −10 dB was used. In order to easily compare the test results of the present invention with those of the '954 patent, a single noise source was selected. (If a plurality of noise sources were used, it would be difficult to compare the noise sources to the '954 patent).

Figure 5A:
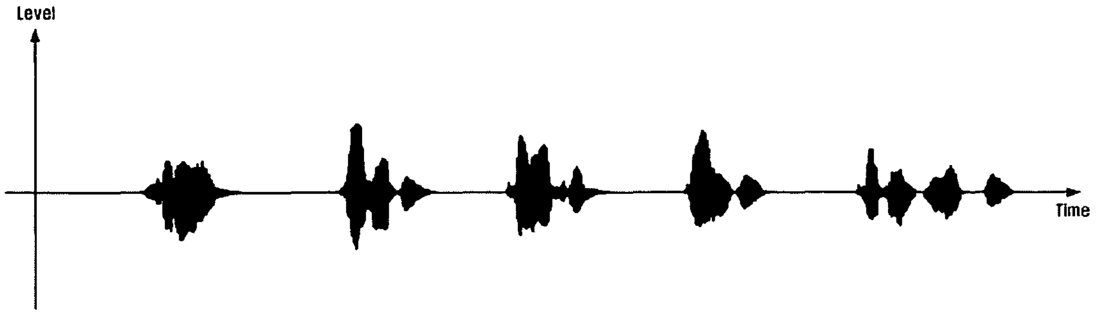
FIG. 5A is a view illustrating an exemplary input voice signal having no noise.
Figure 5B:
FIG. 5B is a view illustrating an exemplary mixed signal (voice/noise) where the SNR is 0 dB.
Figure 5C:
FIG. 5C is a view illustrating an exemplary mixed signal (voice/noise) where the SNR −10 dB.
Figure 6A:
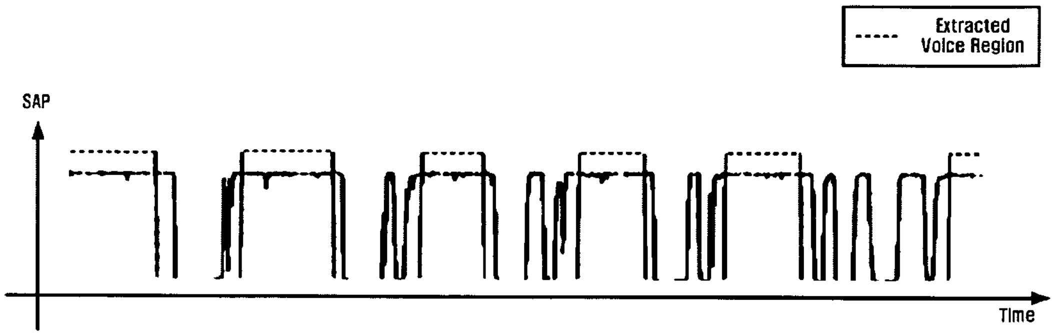
FIG. 6A is a view illustrating a speech absence probability (SAP) computed by receiving the signal as shown in FIG. 5B, in accordance with the prior art.
Figure 6B:
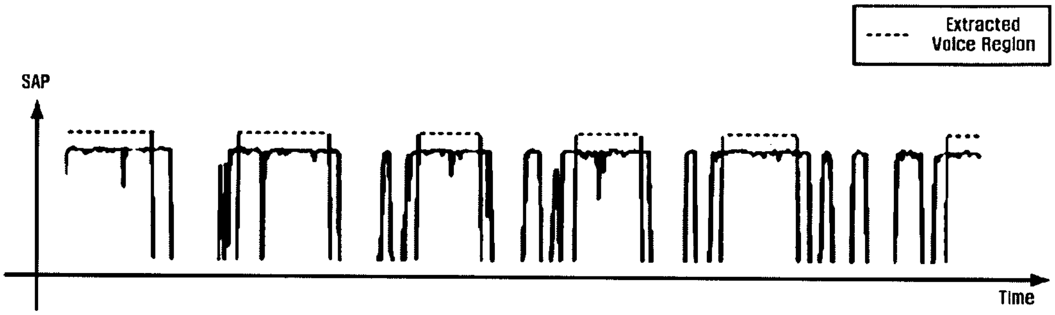
FIG. 6B is a view illustrating a SAP computed by receiving the signal as shown in FIG. 5B, in accordance with the present invention.

The input voice signal, to which almost no noise is added, is shown in FIG. 5A, and the mixed voice/noise signal having the SNR of 0 dB is shown in FIG. 5B. Also, the mixed voice/noise signal having the SNR of −10 dB is shown in FIG. 5C. The test result according to the '954 patent in the case in which the signal has the SNR of 0 dB is shown in FIG. 6A, and the test result according to the present invention is shown in FIG. 6B. In this case, the difference between the present invention and the '954 patent is not large.

Figure 7A:
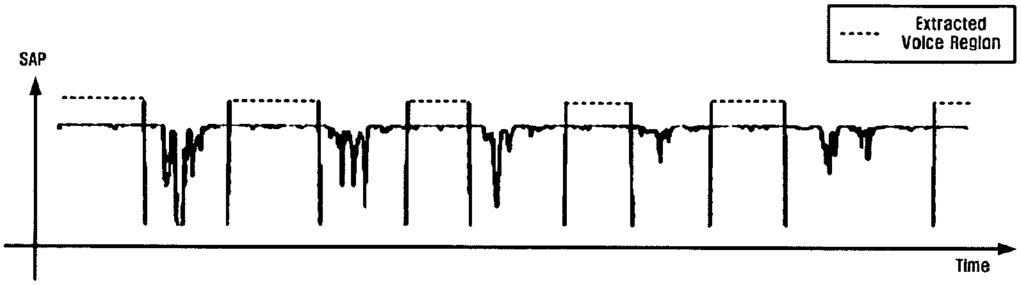
FIG. 7A is a view illustrating a SAP computed by receiving the signal as shown in FIG. 5C, in accordance with the prior art.
Figure 7B:
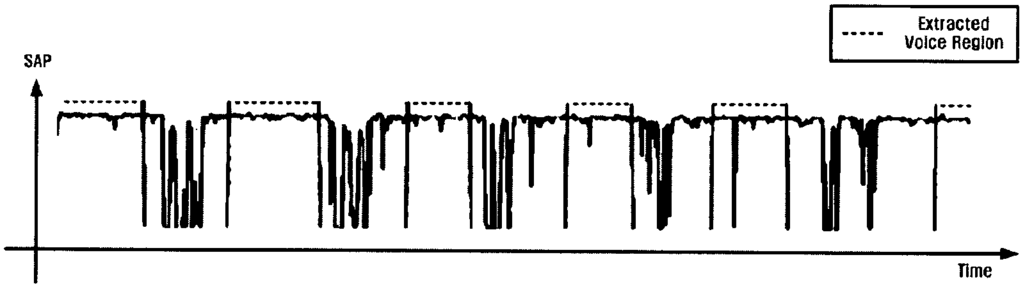
FIG. 7B is a view illustrating a SAP computed by receiving the signal as shown in FIG. 5C, in accordance with the present invention.

However, if the noise signal level is increased by making the SNR of the signal −10 dB, the test result differences between the present invention and the '954 patent become great. In the case in which the SNR is −10 dB, the test result according to the '954 patent is shown in FIG. 7A, and the test result according to the present invention is shown in FIG. 7B. It can be well recognized that the voice region in FIG. 7B can be more easily discriminated in comparison to the voice region in FIG. 7A.

The test results shown in FIGS. 6A and 6B are detailed in Table 1, and the test results shown in FIGS. 7A and 7B are detailed in Table 2.

TABLE 1

| Test Results | | | |
|---|---|---|---|
| | $\frac{P[H_1]}{P[H_0]}$ | SAP in Voice Region | SAP in Noise Region |
| '954 Patent | 0.0100 | 0.3801 | 0.8330 |
| Present | 0.0100 | 0.3501 | 0.8506 |
| Invention | 0.0057 | 0.3802 | 0.9102 |

TABLE 2

| Test Results | | | |
|---|---|---|---|
| | $\frac{P[H_1]}{P[H_0]}$ | SAP in Voice Region | SAP in Noise Region |
| '954 Patent | 0.0100 | 0.7183 | 0.8008 |
| Present | 0.0100 | 0.6792 | 0.8748 |
| Invention | 0.0068 | 0.7188 | 0.9116 |

Referring to Tables 1 and 2, the present invention has two data comparisons: one refers to the test result performed at the same P[H1]/P[H2] ratio as that of '954 patent (i.e., P[H1]/P[H2]=0.0100), and the other refers to the result of SAP comparison in the noise region if the same SAP is set in the voice region (with different P[H1]/P[H2] ratios).

Referring to Tables 1 and 2, the present invention shows superior results to those of the '954 patent irrespective of the SNR (when the SAP is lowered in the voice region or the SAP is heightened in the noise region, a superior result is obtained). In particular, in an environment having a low SNR, i.e., in an environment in which it is difficult to discriminate between the voice and the noise, the superiority of the present invention is particularly apparent.

If the voice region is detected according to the present invention, voice recognition and voice compression efficiency are improved. Also, the present invention may be utilized in a technique for removing noise components from the voice region.

As described above, the present invention has the advantage that it can accurately judge whether a voice exists in the present signal in an environment in which various kinds of noises exist.

Since an input signal is modeled by a Gaussian mixture model, a more generalized signal that does not follow the single Gaussian mixture model can be modeled.

Additionally, according to the present invention, by providing updated information according to time, such as the updated speed or acceleration between frames, signals having similar statistical characteristics can also be discriminated from each other.

Although preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A voice discrimination apparatus including a processor for determining whether an input sound signal corresponds to a voice region or a non-voice region, comprising:

a domain transform unit, controlled by the processor, for transforming an input sound signal frame into a frame in the frequency domain;

a dimensional spatial transform unit for linearly transforming the domain of the transformed frame to reduce a dimension of the transformed frame;

a model training/update unit for setting a voice model and a plurality of noise models in the linearly transformed domain, and initializing or updating the voice model and the noise models;

a speech absence probability (SAP) computation unit for obtaining an SAP computation equation for each of a plurality of simultaneous noise sources by using the initialized or updated voice model and noise models and substituting the transformed frame into each equation to compute the SAP for each noise source;

a noise source selection unit for selecting a noise source having a minimum SAP from among the plurality of noise sources by comparing the SAPs computed for each of the plurality of noise sources; and a voice judgment unit for judging whether the input frame corresponds to the voice region in accordance with the SAP level of the selected noise source;

wherein the dimensional spatial transform unit creates a derivative frame and linearly transforms an integrated frame configured by combining the transformed frame and the derivative frame.

2. The apparatus as claimed in claim 1, further comprising a frame division unit for dividing the input sound signal into a plurality of sound signal frames.

3. The apparatus as claimed in claim 1, wherein the domain transform unit transforms the input sound signal fame into a frame in the frequency domain using a discrete Fourier transform.

4. The apparatus as claimed in claim 1, wherein the model training/update unit updates the voice model if the input frame is determined to be voice frame, and updates the noise models if the input frame is determined to be a noise frame.

5. The apparatus as claimed in claim 1, wherein the plurality of noise models are modeled by a Gaussian mixture model.

6. The apparatus as claimed in claim 1, wherein the voice model is a single Gaussian model.

7. The apparatus as claimed in claim 1, wherein the voice model is a Laplacian model.

8. The apparatus as claimed in claim 1, wherein the model training/update unit initializes or updates parameters of the plurality of noise models with an expectation maximization algorithm.

9. The apparatus as claimed in claim 1, wherein the noise source selection unit selects the noise source having the minimum SAP, or selects the noise source having the maximum speech presence probability, wherein speech presence probability is 1-SAP.

10. The apparatus as claimed in claim 1, wherein the voice judgment unit determines that the input frame corresponds to a voice region when the SAP level is lower than a given critical value.

11. The apparatus as claimed in claim 1, wherein the linear transform is performed by a Mel filter bank.

12. The apparatus as claimed in claim 1, wherein the derivative frame is obtained from a desired number of frames positioned adjacent to a present frame and is indicative of a relation between the present frame and the adjacent frames.

13. A voice discrimination method for determining whether an input sound signal corresponds to a voice region or a non-voice region, the method comprising the steps of:

transforming an input sound signal frame into a frame in the frequency domain;

linearly transforming the domain of the transformed frame to reduce a dimension of the transformed frame;

setting a voice model and a plurality of noise models in the linearly transformed domain, and initializing or updating the voice model and the noise models;

obtaining a speech absence probability (SAP) computation equation for each of a plurality of simultaneous noise sources by using the initialized or updated voice model and noise models;

substituting the transformed frame into each equation to compute the SAP for each noise source;

comparing the SAPs computed for the plurality of noise sources to select a noise source having a minimum SAP from among the plurality of noise sources; and judging whether the input frame corresponds to the voice region in accordance with the SAP level of the selected noise source;

wherein the linear transform step creates a derivative frame, and linearly transforms an integrated frame configured by combining the frequency domain frame and the derivative frame.

14. The method as claimed in claim 13, wherein the setting step updates the voice model if the input frame is determined to be a voice frame, and updates the noise models if the input frame is determined to be a noise frame.

15. A non-transitory medium containing a computer-readable program that implements the method claimed in claim 13.

* * * * *